(12) United States Patent
Sato

(10) Patent No.: US 8,451,467 B2
(45) Date of Patent: May 28, 2013

(54) PRINTING APPARATUS, METHOD FOR CONTROLLING PRINT JOB, AND COMPUTER PROGRAM FOR PRE-REGISTERING CONDITION INFORMATION RELATING TO CONDITIONS FOR CANCELLING EXECUTION OF A PRINT JOB

(75) Inventor: Yuichiro Sato, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1114 days.

(21) Appl. No.: 12/238,912

(22) Filed: Sep. 26, 2008

(65) Prior Publication Data

US 2009/0086267 A1 Apr. 2, 2009

(30) Foreign Application Priority Data

Sep. 28, 2007 (JP) ................................. 2007-255482

(51) Int. Cl.
*G06F 3/12* (2006.01)
*G06K 15/00* (2006.01)

(52) U.S. Cl.
USPC ........ 358/1.14; 358/1.15; 358/1.13; 358/1.16

(58) Field of Classification Search
USPC .............................. 358/1.9, 1.1–1.18; 399/81
See application file for complete search history.

(56) References Cited

U.S. PATENT DOCUMENTS

| 6,009,241 | A | * | 12/1999 | Kawamoto | 358/1.9 |
| 6,958,822 | B2 | * | 10/2005 | Lester et al. | 358/1.14 |
| 7,072,065 | B2 | * | 7/2006 | Lester et al. | 358/1.15 |
| 7,242,488 | B2 | | 7/2007 | Matsueda | |
| 7,345,777 | B2 | * | 3/2008 | Lester et al. | 358/1.14 |
| 2002/0163570 | A1 | * | 11/2002 | Phillips | 347/224 |
| 2004/0047643 | A1 | * | 3/2004 | Jackelen et al. | 399/81 |
| 2004/0190039 | A1 | * | 9/2004 | Lay et al. | 358/1.14 |
| 2005/0219612 | A1 | * | 10/2005 | Nakagawa | 358/1.15 |
| 2008/0049247 | A1 | * | 2/2008 | Asai et al. | 358/1.15 |
| 2008/0079993 | A1 | * | 4/2008 | Kanamoto | 358/1.15 |

FOREIGN PATENT DOCUMENTS

| JP | 2002-149367 A | 5/2002 |
| JP | 2002-366317 A | 12/2002 |
| JP | 2005012661 A * | 1/2005 |

\* cited by examiner

*Primary Examiner* — Dennis Dicker
(74) *Attorney, Agent, or Firm* — Canon USA, Inc., I.P. Division

(57) ABSTRACT

A printing apparatus has a filter ID, the number of deleted print jobs, and a print job deletion filter including at least one filtering condition registered therein. The filtering condition includes a job attribute, a keyword, and a search method. Upon receiving a print job including print data and job information from a print server system, the printing apparatus determines whether the job information contained in the print job satisfies the filtering condition. If the job information contained in the print job satisfies the filtering condition, the printing apparatus deletes the print job identified by the job information.

6 Claims, 11 Drawing Sheets

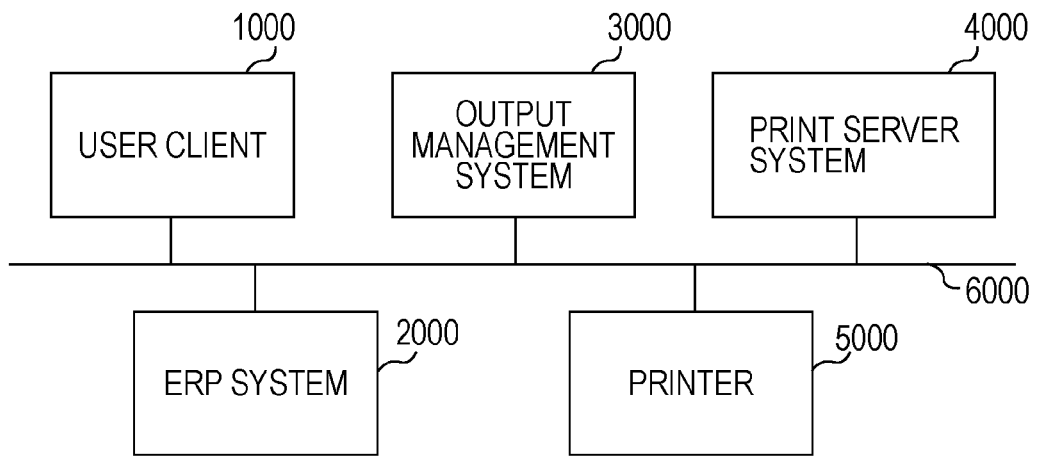
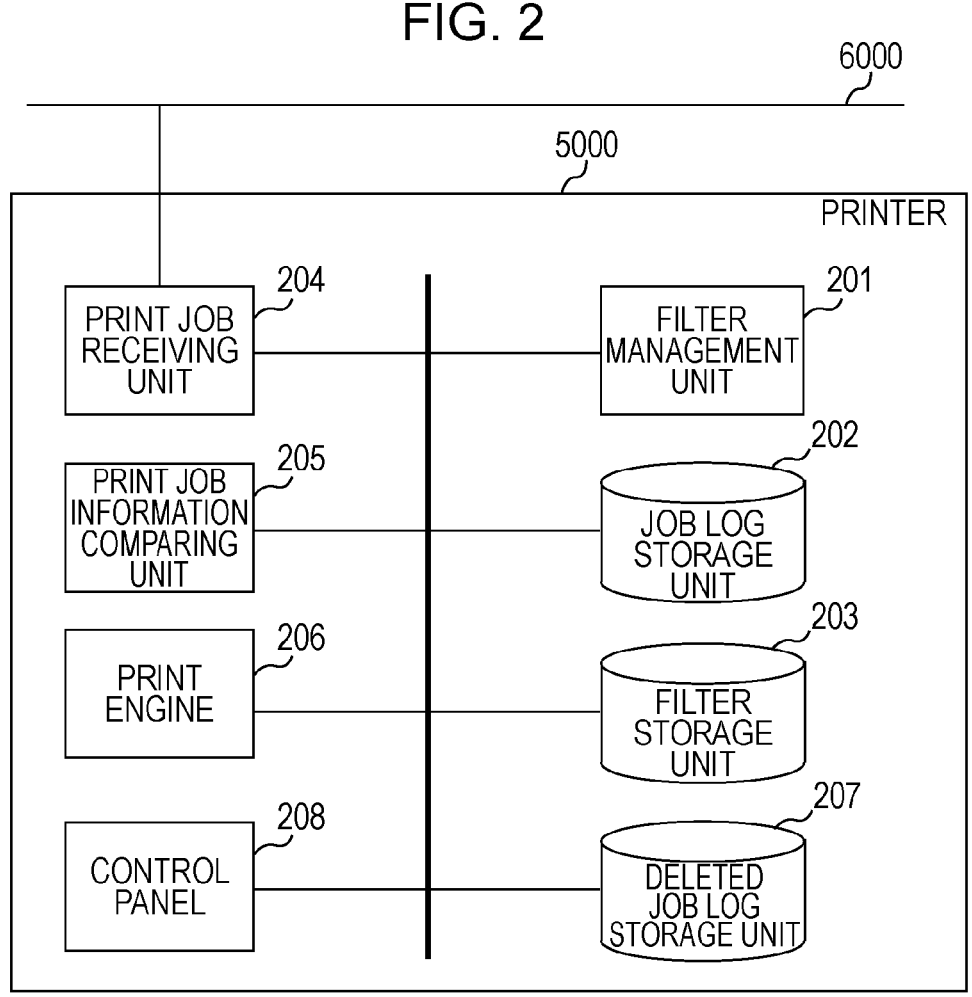

FIG. 7

FILTER CONFIRMATION SCREEN

| NO. | ENABLED | CONDITION | OPERATION | NUMBER OF DELETING OPERATIONS |
|---|---|---|---|---|
| 001 | YES | APPL. NAME "AcroRd32.exe", ADDRESS "x", ... | DELETE IMMEDIATELY | 15 |
| 002 | YES | APPL. NAME "msword.exe", PAGE COUNT "8", ... | ASK QUESTION | 0 |
| 003 | NO | APPL. NAME "AcroRd32.exe", ADDRESS "x", ... | ASK QUESTION | 1 |
| 004 | YES | APPL. NAME "AcroRd32.exe", ADDRESS "x", ... | DELETE IMMEDIATELY | 0 |

ADD    DELETE    EDIT    ENABLE/DISABLE

FIG. 8

| FILTER GENERATION SCREEN | | |
|---|---|---|
| FILTER WILL BE GENERATED USING FOLLOWING CONDITIONS 911 | | |
| PRINT ATTRIBUTE | INFORMATION | SEARCH METHOD |
| APPLICATION FILE NAME | AcroRd32.exe | FULL MATCH ◀ |
| HOST ADDRESS INFORMATION | xxx.xxx.xxx.xxx | PARTIAL MATCH |
| USER NAME | sato | FULL MATCH |
| JOB NAME | ABC | STARTS-WITH-KEYWORD MATCH ▶ |
| TEST 912 | OK 913 | GENERATE FROM LOG 914 | EDIT 915 | CANCEL 916 |

TEMPLATE SELECTION SCREEN (GENERATION FROM LOG) — 920
SELECT JOB CONVERTED TO FILTER — 921

| NO. | DATE AND TIME | JOB NAME | USER NAME | PAGE COUNT × COPY COUNT |
|-----|---------------|----------|-----------|--------------------------|
|     |               |          |           | ◄ |
| 001 | 5/13 18:48 | ZLIBINVOICE20070513 | 000011 | 2 × 1 |
| 002 | 5/18 10:15 | MANUAL-ERROR-REPORT.xls | sato | 3 × 10 |
| 003 | 6/9 23:30 | 200706INVOICE.pdf | abc | 100 × 2 |
| 004 | 6/14 19:15 | xxxxx | 123456 | 32 × 20 |
|     |               |          |           | ► — 923 |

OK — 922     CANCEL

FIG. 13

FILTERING TEST RESULT
FOLLOWING JOBS SATISFY FILTERING CONDITION

| NO. | DATE AND TIME | JOB NAME | USER NAME | PAGE COUNT × COPY COUNT |
|---|---|---|---|---|
| 010 | MAY 13 18:48 | ZLIBINVOICE20070513.pdf | 000011 | 2 × 1 |
| 015 | MAY 18 10:15 | 200705INVOICE.pdf | sato | 3 × 10 |
| 085 | JUNE 9 23:30 | 200706INVOICE.pdf | abc | 100 × 2 |
| 126 | JUNE 14 19:15 | WORLD-COMPANY-CAFETERIA.pdf | 123456 | 32 × 20 |

OK

PRINTING APPARATUS, METHOD FOR CONTROLLING PRINT JOB, AND COMPUTER PROGRAM FOR PRE-REGISTERING CONDITION INFORMATION RELATING TO CONDITIONS FOR CANCELLING EXECUTION OF A PRINT JOB

BACKGROUND OF THE INVENTION

1. Field of the Invention

The present invention relates to a printing apparatus, a method for controlling a print job, and a computer program and, in particular, to a printing apparatus, a method for controlling a print job, and a computer program suitable for canceling the execution of a print job.

2. Description of the Related Art

A variety of techniques for canceling a print job submitted to a printer have been developed (refer to, for example, Japanese Patent Laid-Open No. 2002-366317).

In these techniques, upon receiving a job cancel request from an application, it is determined whether the job to be canceled is registered with a job queue of a printer. If the job to be canceled is not registered with the job queue of the printer, the schedule for deleting the job is registered in a management table of a printing system. Thereafter, upon receiving a job generation event from the printer, the printing system determines whether a job contained in the event is the same as the job in the deletion schedule. If the jobs are the same, the job is immediately deleted.

In recent years, in order to facilitate enterprise activities, many enterprises have employed enterprise resource planning (ERP) systems. ERP systems are information systems for assisting control of business activities, such as sales, delivery, billing, manufacturing, inventory management, and human resource management. An example of the ERP package is SAP R/3 available from SAP AG, Germany.

In addition, recently, the complexity of printing systems has been increased, and the printing systems have been converted from closed systems to open systems. Accordingly, in order to provide users with value-added printing features, such as overlay printing and print job control, ERP systems send print data to a variety of printing systems. As used herein, the term "overlay printing" refers to printing in which print data are printed in a form so as to be a single printout.

Accordingly, output management systems have been developed that process print data output from an ERP system, send the print data to a printing system, and return the printing state of the printing system and the printing result to the ERP system. Examples of such output management systems include "imageWARE Enterprise Gateway" available from CANON KABUSHIKI KAISHA.

However, ERP systems send print data via a plurality of systems, including open systems. Therefore, in the above-described existing techniques, the printing result may not be returned to users of the ERP systems, or a print cancellation request may not be sent from the users to a printing system, depending on the interface between the systems.

In addition, in the case of a system including an output management system that submits print jobs to a plurality of print server systems, one print instruction triggers printing operations performed by a plurality of printers. Accordingly, a user cannot know the route of the print instruction that the user inputs in a plurality of systems. Therefore, when the user attempts to cancel the print instruction, the user cannot cancel a printing operation performed by a specific one of the printers without operating the printer, although the user can cancel all of the printing operations performed by the printers. More specifically, in order to cancel a printing operation, a user needs to stand by in front of the printer until the printer receives the sent print job. After the printer receives the sent print job, the user needs to delete the print job via a console panel of the printer. In some cases where transmission of the print job is delayed, the user needs to wait for arrival of the print job in front of the printer for a long time.

SUMMARY OF THE INVENTION

The present invention provides a method for canceling a print job reliably, as compared with existing methods.

The present invention further provides a method for reducing the load imposed on a user when canceling a print job, as compared with existing methods.

According to an embodiment of the present invention, a printing apparatus includes a registering unit configured to pre-register condition information relating to conditions for canceling execution of a print job in a storage medium, a receiving unit configured to receive the print job, a first determination unit configured to determine whether the print job received by the receiving unit satisfies the condition information registered by the registering unit, and a canceling unit configured to cancel execution of the print job received by the receiving unit when the first determination unit determines that the print job received by the receiving unit satisfies the condition information registered by the registering unit.

According to another embodiment of the present invention, a method for controlling a print job includes pre-registering condition information relating to conditions for canceling execution of a print job in a storage medium, receiving the print job, determining whether the received print job satisfies the condition information, and canceling execution of the received print job when it is determined that the received print job satisfies the condition information.

According to still another embodiment of the present invention, a computer readable storage medium having a computer-executable program code stored thereon for causing a computer to execute a method for controlling a print job is provided. The method includes pre-registering condition information relating to conditions for canceling execution of the print job in a storage medium, determining whether the received print job satisfies the condition information, and canceling execution of the received print job when it is determined that the received print job satisfies the condition information.

According to the present invention, condition information relating to conditions for canceling execution of a print job is pre-registered in a storage medium. Subsequently, when a print job is received, it is determined whether the print job satisfies the condition information. If it is determined that the print job satisfies the condition information, execution of the print job is canceled. Accordingly, for example, execution of the print job can be canceled without requesting the printing apparatus to cancel the execution of the print job. Furthermore, for example, users need not wait for arrival of a print job in front of the printing apparatus and cancel execution of the print job through a console panel of the printing apparatus. Therefore, execution of a print job can be cancelled reliably.

Further features and aspects of the present invention will become apparent from the following description of exemplary embodiments with reference to the attached drawings.

BRIEF DESCRIPTION OF THE DRAWINGS

FIG. 1 is a block diagram of an exemplary printing system according to an embodiment of the present invention.

FIG. 2 is a block diagram illustrating the "structure for a printing operation" in a printer according to the embodiment of the present invention.

FIG. 7 illustrates an example of a job deletion filter confirmation screen according to the embodiment of the present invention.

FIG. 8 illustrates an example of a job deletion filter generation screen according to the embodiment of the present invention.

FIG. 9 illustrates an example of a template selection screen according to the embodiment of the present invention.

FIG. 13 illustrates an example of a filtering test result display screen according to the embodiment of the present invention.

DESCRIPTION OF THE EMBODIMENTS

Figure 3:
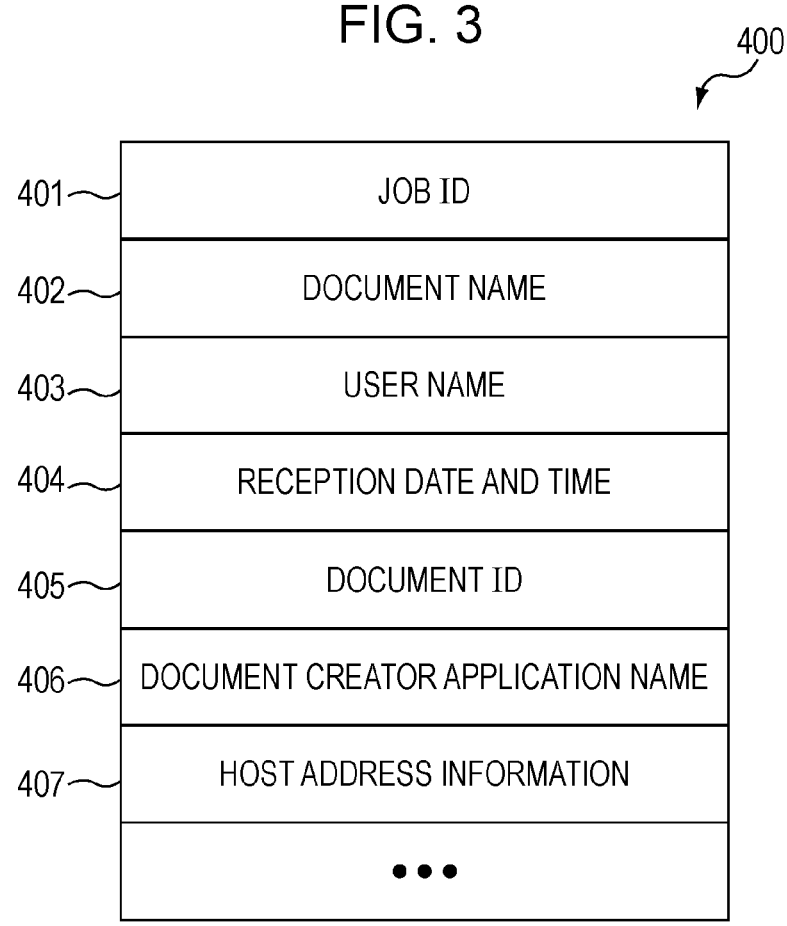
FIG. 3 is a schematic illustration of exemplary job information according to the embodiment of the present invention.

Various exemplary embodiments of the present invention are described below with reference to the accompanying drawings. FIG. 1 is a block diagram of an exemplary printing system according to an embodiment of the present invention. As shown in FIG. 1, the printing system includes a user client 1000, an ERP system 2000, an output management system 3000, a print server system 4000, and a printer 5000, which are connected to a network 6000 so as to communicate with each other. Each of the user client 1000, the ERP system 2000, the output management system 3000, and the print server system 4000 can be realized by using, for example, a personal computer.

Upon receiving a print request from the user client 1000 (a user), the ERP system 2000 extracts (or generates) print data corresponding to the print request. The ERP system 2000 then transmits the print data to the output management system 3000 together with job information in the form of a print job. The output management system 3000 converts the received print job into a format that can be processed by the print server system 4000. Thereafter, the output management system 3000 transmits the print data to the print server system 4000.

The print server system 4000 transmits the received print data to the printer 5000. Note that a plurality of the print server systems 4000 may be used. In such a case, the output management system 3000 transmits the print job to each of the print server systems 4000.

The printer 5000 compares pieces of the job information contained in the print job received from the print server system 4000 with filtering conditions of the printer 5000. If the job information satisfies the filtering conditions, the printer 5000 deletes the print job. However, if the job information does not satisfy the filtering conditions, the printer 5000 stores the job information therein in the form of a print log and performs a printing operation for the job. As a result, the printer 5000 outputs a printout.

FIG. 2 is a block diagram illustrating the "structure for a printing operation" in the printer 5000. As shown in FIG. 2, the printer 5000 includes a filter management unit 201, a job log storage unit 202, a filter storage unit 203, a print job receiving unit 204, and a print job information comparing unit 205. The printer 5000 further includes a print engine 206, a deleted job log storage unit 207, and a control panel 208.

The filter management unit 201 generates or updates a print job deletion filter described below. The filter management unit 201 provides users with an application screen used for generating a print job deletion filter 500.

The job log storage unit 202 stores the job information contained in the print job transmitted to the printer 5000. The job information stored in the job log storage unit 202 is used for generating a print job deletion filter by the filter management unit 201.

FIG. 3 is a schematic illustration of exemplary job information 400. As shown in FIG. 3, the job information 400 includes the following pieces of information about a print job: a job ID 401, a document name 402, a user name 403, a reception date and time 404, a document ID 405, a document creator application name 406, and host address information 407. However, the pieces of the job information 400 are not limited to those shown in FIG. 3. For example, in addition to those shown in FIG. 3, any pieces of information that are related to a print job and that can be received by the printer 5000 can be contained in the job information 400. Examples of these pieces of information include the number of copies, the number of pages, and the destination of a printout.

Figure 4A:
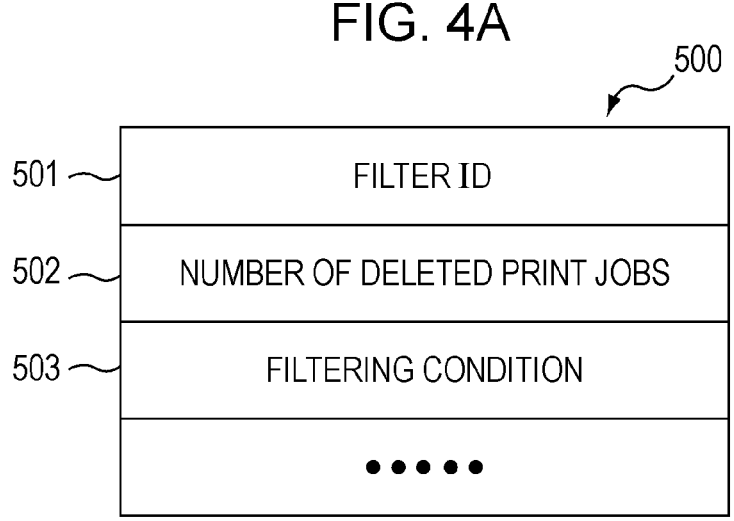
FIGS. 4A and 4B are schematic illustrations of an exemplary print job deletion filter according to the embodiment of the present invention.
Figure 4B:
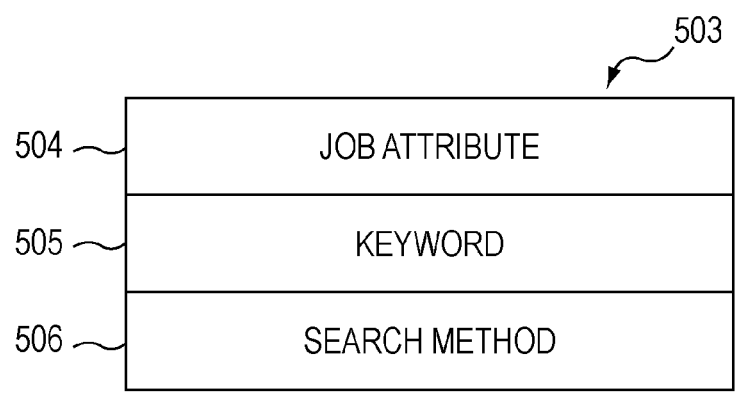

FIGS. 4A and 4B are schematic illustrations of an exemplary print job deletion filter 500. As shown in FIG. 4A, the print job deletion filter 500 includes a filter ID 501, the number of deleted print jobs 502, and at least one filtering condition 503. In addition, as shown in FIG. 4B, the filtering condition 503 includes a job attribute 504, a keyword 505, and a search method 506.

The job attribute 504 contains the attribute name of the job information that is to be compared with the job information 400. For example, character string information "document creator application name" is contained in the job attribute 504.

In addition, the keyword 505 contains a keyword used for searching for the value of a job attribute specified in the job attribute 504. For example, character string information "word.exe" is used for the keyword 505.

The search method 506 indicates a method for comparing the keyword 505 with the information contained in the job information 400 to be compared. For example, in order that a match is found if the keyword contained in the keyword 505 partially matches the document creator application name 406 contained in the job information 400, character string information "partial match" is used in the search method 506.

Note that the job attribute 504 of the filtering condition 503 contained in the print job deletion filter 500 indicates an attribute name of the job information 400. Any information that can be received by the printer 5000 can be used for the job attribute 504. For example, in addition to the information in the job information 400 shown in FIG. 3, attributes, such as the number of copies, the number of pages, and the destination of a printout, may be used for the job attribute 504.

In addition, the search method 506 is not limited to the above-described information "partial match". For example, in order that a match is found only if a keyword contained in the full keyword 505 matches the full document creator application name 406, character string information "full match" may be used in the search method 506. Furthermore, in order that a match is found only if the document creator application name 406 starts with the keyword 505, character string information "starts-with-keyword match" may be used in the search method 506.

The filter storage unit 203 stores the print job deletion filter 500 generated (or updated) by the filter management unit 201.

The print job receiving unit 204 receives the print job received by the printer 5000 and stores the job information 400 about the print job in the job log storage unit 202. The job information 400 serves as a job log.

The print job information comparing unit 205 compares the job information 400 about the print job received by the print job receiving unit 204 with the print job deletion filter 500 stored in the filter storage unit 203. In this way, the print job information comparing unit 205 determines whether it deletes the print job received by the print job receiving unit 204 or prints the print job.

If the print job information comparing unit 205 determines that a printing operation is performed for the print job received by the print job receiving unit 204, the print engine 206 performs a printing operation for the print job and outputs a printout.

However, if the print job information comparing unit 205 determines that it deletes the print job received by the print job receiving unit 204, the deleted job log storage unit 207 generates the job information 400 about the print job and deleted print job information including the filter ID 501 and stores the information. The deleted print job information is used when the filter management unit 201 updates the print job deletion filter 500.

Figure 5:
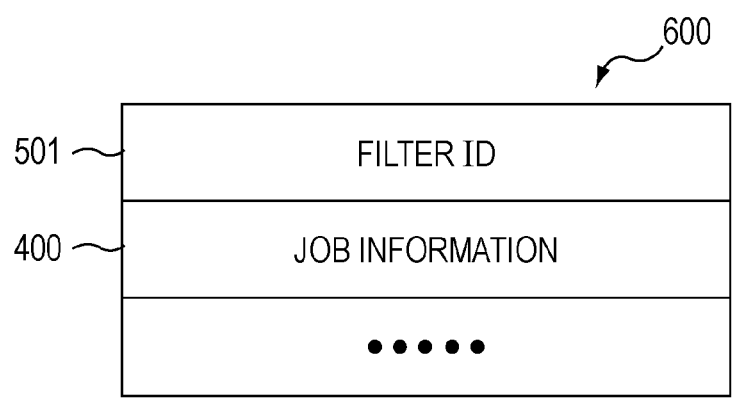
FIG. 5 is a schematic illustration of exemplary deleted print job information according to the embodiment of the present invention.

FIG. 5 is a schematic illustration of exemplary deleted print job information stored in the deleted job log storage unit 207. As described above, deleted print job information 600 includes the filter ID 501 and the job information 400.

The control panel 208 displays screens used by a user when the user instructs the filter management unit 201 to generate a print job deletion filter 500 or update the print job deletion filter 500. The control panel 208 receives a user instruction and transmits the received instruction to the filter management unit 201.

Each of the above-described filter management unit 201, job log storage unit 202, filter storage unit 203, print job information comparing unit 205, and deleted job log storage unit 207 can be realized by using, for example, a personal computer. In addition, the print job receiving unit 204 can be realized by using, for example, a communications interface. The print engine 206 can be realized by using, for example, a printing mechanism that forms an image on a sheet of paper and a conveying mechanism that conveys the sheet of paper. Furthermore, the control panel 208 can be realized by using, for example, a liquid crystal display device having a touch panel and an operation element, such as a button.

Printing Process

Figure 6:
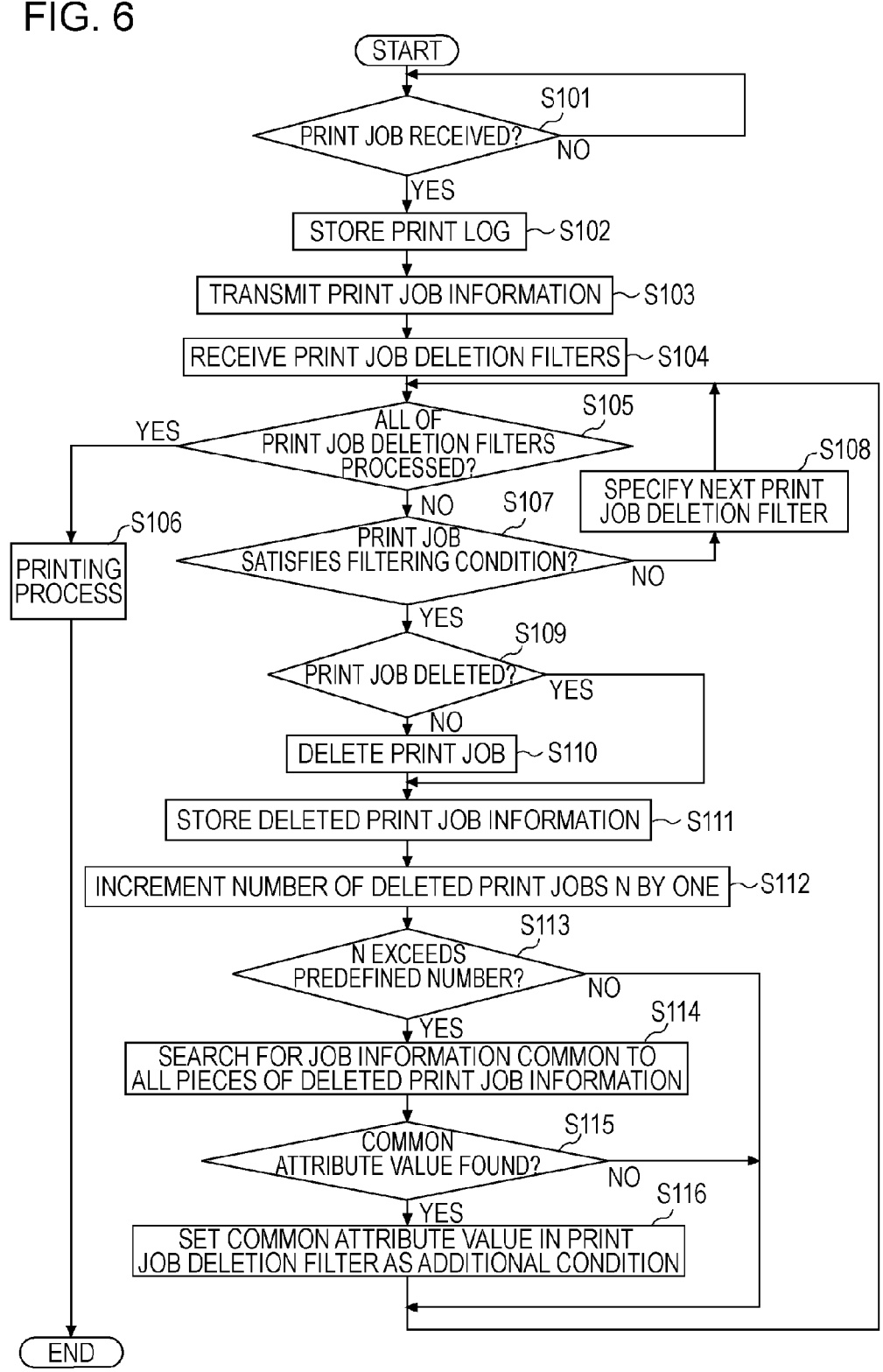
FIG. 6 is a flow chart of exemplary printing process and update process of a print job deletion filter performed by the printer according to the embodiment of the present invention.

FIG. 6 is a flow chart of an exemplary printing process and an exemplary update process of a plurality of print job deletion filters 500 performed by the printer 5000.

First, at step S101, the print job receiving unit 204 enters a ready state until it receives, from the print server system 4000, a print job including print data and the job information 400. Upon receiving a print job, the processing proceeds to step S102. In this way, according to the present embodiment, by performing at least processing in step S101, a receiving unit is realized.

In step S102, the print job receiving unit 204 stores, in the job log storage unit 202, the job information 400 received by the print job receiving unit 204 in step S101 in the form of a print job log. In this way, according to the present embodiment, by performing at least processing in step S102, a first storing unit is realized.

In step S103, the print job receiving unit 204 transmits the job information 400 received by the print job receiving unit 204 in step S101 to the print job information comparing unit 205.

In step S104, the print job information comparing unit 205 sends a request to the filter storage unit 203 in order to receive the print job deletion filter 500. Upon receiving the request for receiving the print job deletion filter 500 from the print job information comparing unit 205, the filter storage unit 203 transmits, to the print job information comparing unit 205, one or more print job deletion filters 500 that are stored in the filter storage unit 203.

In step S105, the print job information comparing unit 205 determines whether it has processed all of the print job deletion filters 500 received from the filter storage unit 203. If all of the print job deletion filters 500 received from the filter storage unit 203 have been processed, the processing proceeds to step S106. Otherwise, the processing proceeds to step S107, which is described below. In addition, if the print job information comparing unit 205 has received no print job deletion filters 500 from the filter storage unit 203, the processing proceeds to step S106.

As described above, when all of the print job deletion filters 500 received from the filter storage unit 203 have been processed or no print job deletion filters 500 are received from the filter storage unit 203, the processing proceeds to step S106. When the processing proceeds to step S106, it is considered that the job information 400 about the print job received by the print job receiving unit 204 does not satisfy the filtering condition 503 of any one of the print job deletion filters 500. Therefore, in step S106, the print job information comparing unit 205 transmits the print data received by the print job receiving unit 204 in step S101 to the print engine 206. The print engine 206 processes the print data received from the print job information comparing unit 205 and outputs a printout.

However, if, in step S105, all of the print job deletion filters 500 received from the filter storage unit 203 have not been processed, the processing proceeds to step S107. The print job information comparing unit 205 determines whether the job information 400 received from the print job receiving unit 204 satisfies the filtering condition 503 of the print job deletion filter 500 received from the filter storage unit 203 (for example, whether a "partial match" is found).

In this way, according to the present embodiment, by performing at least processing in step S107, a first determination unit is realized.

If it is determined that the job information 400 received from the print job receiving unit 204 does not satisfy the filtering condition 503 of the print job deletion filter 500 received from the filter storage unit 203, the processing proceeds to step S108.

In step S108, the print job information comparing unit 205 specifies the next print job deletion filter 500. Thereafter, the processing returns to step S105. If, in step S108, the next print job deletion filter 500 is not found, it is determined that the processing for all of the print job deletion filters 500 are completed. Accordingly, the processing returns to step S105 without specifying the next print job deletion filter 500.

In contrast, if the job information 400 received from the print job receiving unit 204 satisfies the filtering condition 503 of the print job deletion filter 500 received from the filter storage unit 203, the processing proceeds to step S109.

In step S109, the print job information comparing unit 205 determines whether the print job (the print data and the job information 400) that satisfies the filtering condition 503 has already been deleted. If the print job has not been deleted, the processing proceeds to step S110.

In step S110, the print job information comparing unit 205 deletes the print job (the print data and the job information 400) that satisfies the filtering condition 503. Thereafter, the print job information comparing unit 205 cancels the printing process. In this way, according to the present embodiment, by performing at least processing in step S110, a canceling unit is realized.

However, if the print job (the print data and the job information 400) that satisfies the filtering condition 503 has already been deleted, the processing proceeds to step S111.

In step S111, the print job information comparing unit 205 stores the job information 400 in the deleted job log storage unit 207 together with the filter ID 501 of the print job deletion filter 500 to be processed. The stored information serves as the deleted print job information 600. Concurrently with this processing, the print job information comparing unit 205 transmits the filter ID 501 that was stored as the deleted print job information 600 to the filter management unit 201. In this way, according to the present embodiment, by performing at least processing in step S111, a second storing unit is realized.

In step S112, the print job information comparing unit 205 increments the number of deleted print jobs 502 of the print job deletion filter 500 to be processed by one (adds one to the number of deleted print jobs 502) so as to update the print job deletion filter 500.

Filter Update Process

In step S113, the filter management unit 201 sends a request to the filter storage unit 203 in order to receive the print job deletion filter 500 including the filter ID 501 received from the print job information comparing unit 205. Upon receiving the transmission request from the filter management unit 201, the filter storage unit 203 sends the print job deletion filter 500 to the filter management unit 201.

Subsequently, the filter management unit 201 determines whether the number of deleted print jobs 502 in the received print job deletion filter 500 exceeds a predetermined number (a predefined value) N. If the number of deleted print jobs 502 exceeds the predefined value N, the processing proceeds to step S114. Otherwise, the processing returns to step S105. In this way, according to the present embodiment, by performing at least processing in step S113, a second determination unit is realized.

In step S114, the filter management unit 201 sends a data transmission request to the deleted job log storage unit 207 in order to receive the deleted print job information 600 including the filter ID 501 of the print job deletion filter 500 having the number of deleted print jobs that exceeds the predefined number N.

Upon receiving the data transmission request from the filter management unit 201, the deleted job log storage unit 207 transmits the deleted print job information 600 including the filter ID 501 of the print job deletion filter 500 having the number of deleted print jobs that exceeds the predefined number N.

Subsequently, the filter management unit 201 compares the pieces of the job information 400 of all of the pieces of the deleted print job information 600 received from the deleted job log storage unit 207 with each other so as to search for an item (e.g., the user name 403) of the job information 400 (i.e., the filtering condition 503) that is common to all of the pieces of the deleted print job information 600.

In step S115, the filter management unit 201 determines whether an item of the job information 400 (the filtering condition 503) that is common to all of the pieces of the deleted print job information 600 is found. If an item of the job information 400 (the filtering condition 503) that is common to all of the pieces of the deleted print job information 600 is found, the processing proceeds to step S116. Otherwise, the processing returns to step In step S116, the filter management unit 201 appends the job information 400 (the filtering condition 503) that is common to all of the pieces of the deleted print job information 600 to the print job deletion filter 500 having the number of deleted print jobs 502 that exceeds the predefined number N. In addition, the filter management unit 201 clears the number of deleted print jobs 502 of the print job deletion filter 500 to zero and stores the print job deletion filter 500 to the filter storage unit 203. The processing then returns to step S105. In this way, according to the present embodiment, by performing at least processing in step S116, an update unit is realized.

Filter Generation Process

FIG. 7 illustrates an example of a job deletion filter confirmation screen 900 displayed by the filter management unit 201. As shown in FIG. 7, the job deletion filter confirmation screen 900 includes a filter list table 901, an addition button 902, a deletion button 903, a filtering condition edit button 904, and an enable/disable switch button 905.

The filter list table 901 displays a list of the print job deletion filters 500 stored in the filter storage unit 203.

When a user presses the addition button 902, a job deletion filter generation screen 910 described below is displayed (refer to FIG. 8). When the job deletion filter generation screen 910 is displayed, the operation for generating a new print job deletion filter 500 can be started.

The user selects an entry of the print job deletion filter 500 to be deleted in the filter list table 901 and, subsequently, presses the deletion button 903. Thus, the print job deletion filter 500 is deleted from the filter storage unit 203.

When the user selects an entry of the print job deletion filter 500 to be updated in the filter list table 901 and, subsequently, presses the filtering condition edit button 904, the job deletion filter generation screen 910 is displayed. The print job deletion filter 500 can be updated through the job deletion filter generation screen 910.

When the user selects an entry of the print job deletion filter 500 to be enabled or disabled in the filter list table 901 and, subsequently, presses the enable/disable switch button 905, whether or not a print job is examined using that print job deletion filter 500 can be switched.

FIG. 8 illustrates an example of the job deletion filter generation screen 910 displayed by the filter management unit 201. As shown in FIG. 8, the job deletion filter generation screen 910 includes a filtering condition list table 911, a test button 912, a filtering condition OK button 913, a generation-from-log button 914, a condition edit button 915, and an edit cancel button 916.

In the filtering condition list table 911, the filtering condition 503 of the print job deletion filter 500 selected by using the job deletion filter confirmation screen 900 shown in FIG. 7 is displayed.

The test button 912 is pressed by the user in order to display the test result of comparison between the print job deletion filter 500 displayed in the filtering condition list table 911 and a print log stored in the job log storage unit 202.

The filtering condition OK button 913 is pressed by the user in order to store the print job deletion filter 500 displayed in the filtering condition list table 911 in the filter storage unit 203.

The generation-from-log button 914 is pressed by the user in order to generate the print job deletion filter 500 using the job information 400 of a print job stored in the job log storage unit 202. When the generation-from-log button 914 is pressed, a template selection screen 920 described below is displayed (refer to FIG. 9).

The user selects the filtering condition 503 to be updated in the filtering condition list table 911 and presses the condition edit button 915. Thus, a filtering condition edit screen 930 described below is displayed (refer to FIG. 10). The filtering condition 503 can be edited using the filtering condition edit screen 930.

The edit cancel button 916 is pressed by the user in order to cancel editing of the filtering condition 503 performed through the job deletion filter generation screen 910 and display the job deletion filter confirmation screen 900.

FIG. 9 illustrates an example of the template selection screen 920 displayed by the filter management unit 201. As shown in FIG. 9, the template selection screen 920 includes a print log list table 921, a template OK button 922, and a template cancel button 923.

The print log list table 921 displays a list of the job information 400 about print jobs stored in the job log storage unit 202. The user selects one of the pieces of the job information 400 displayed in the print log list table 921 and, subsequently, presses the template OK button 922. Thus, the print job deletion filter 500 is generated on the basis of the selected piece of the job information 400.

The template cancel button 923 is pressed by the user in order to cancel the operation performed through the template selection screen 920 and display the job deletion filter generation screen 910.

Figure 10:
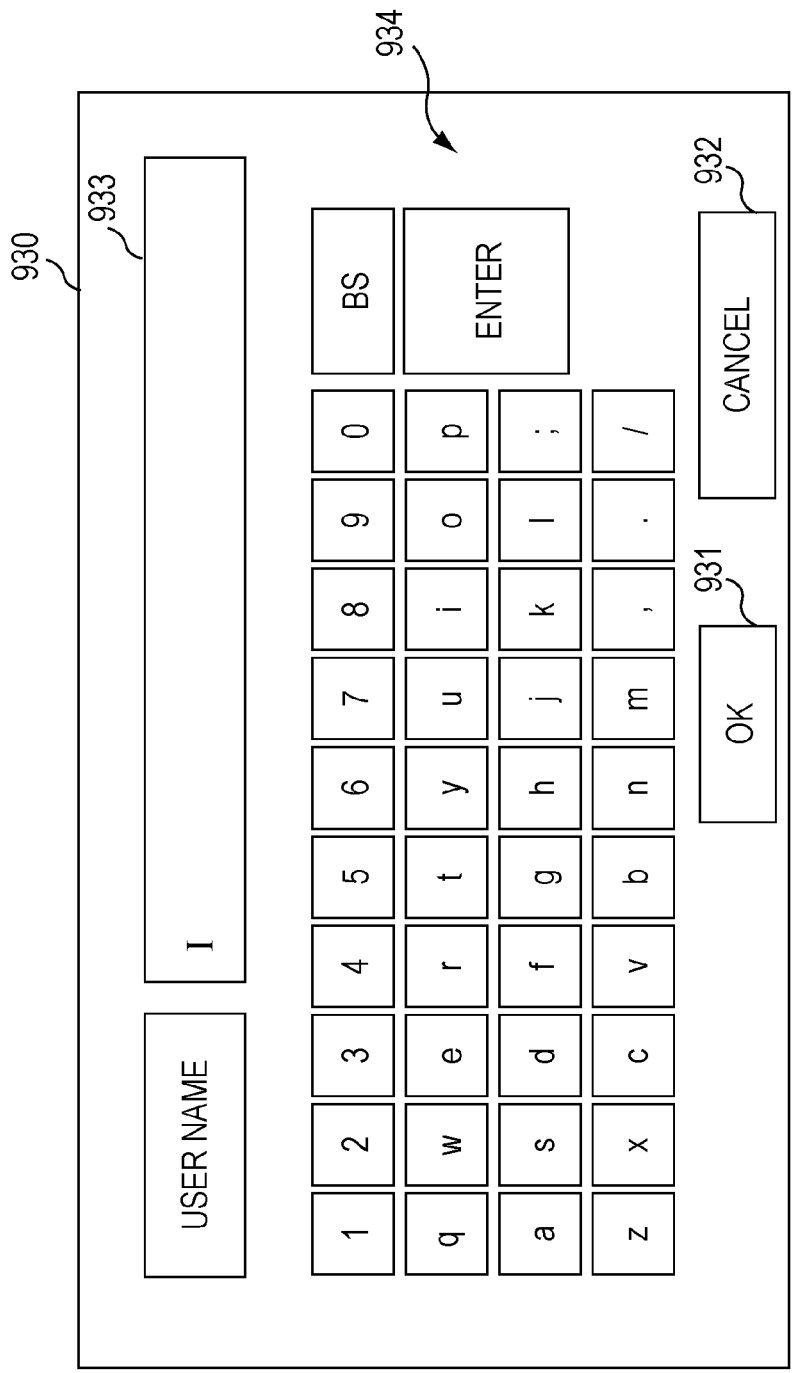
FIG. 10 illustrates an example of a filtering condition change screen according to the embodiment of the present invention.

FIG. 10 illustrates an example of the filtering condition edit screen 930 displayed by the filter management unit 201. As shown in FIG. 10, the filtering condition edit screen 930 includes a filtering condition edit OK button 931 and a filtering condition edit cancel button 932.

Operation buttons 934 are pressed by the user in order to input the filtering condition 503 to a filtering condition display field 933.

The filtering condition edit OK button 931 is pressed by the user in order to validate the information in the filtering condition 503 edited through the filtering condition edit screen 930 (the information of the filtering condition 503 input to the filtering condition display field 933).

The filtering condition edit cancel button 932 is pressed by the user in order to cancel editing of the information of the filtering condition 503 edited through the filtering condition edit screen 930.

Figure 11:
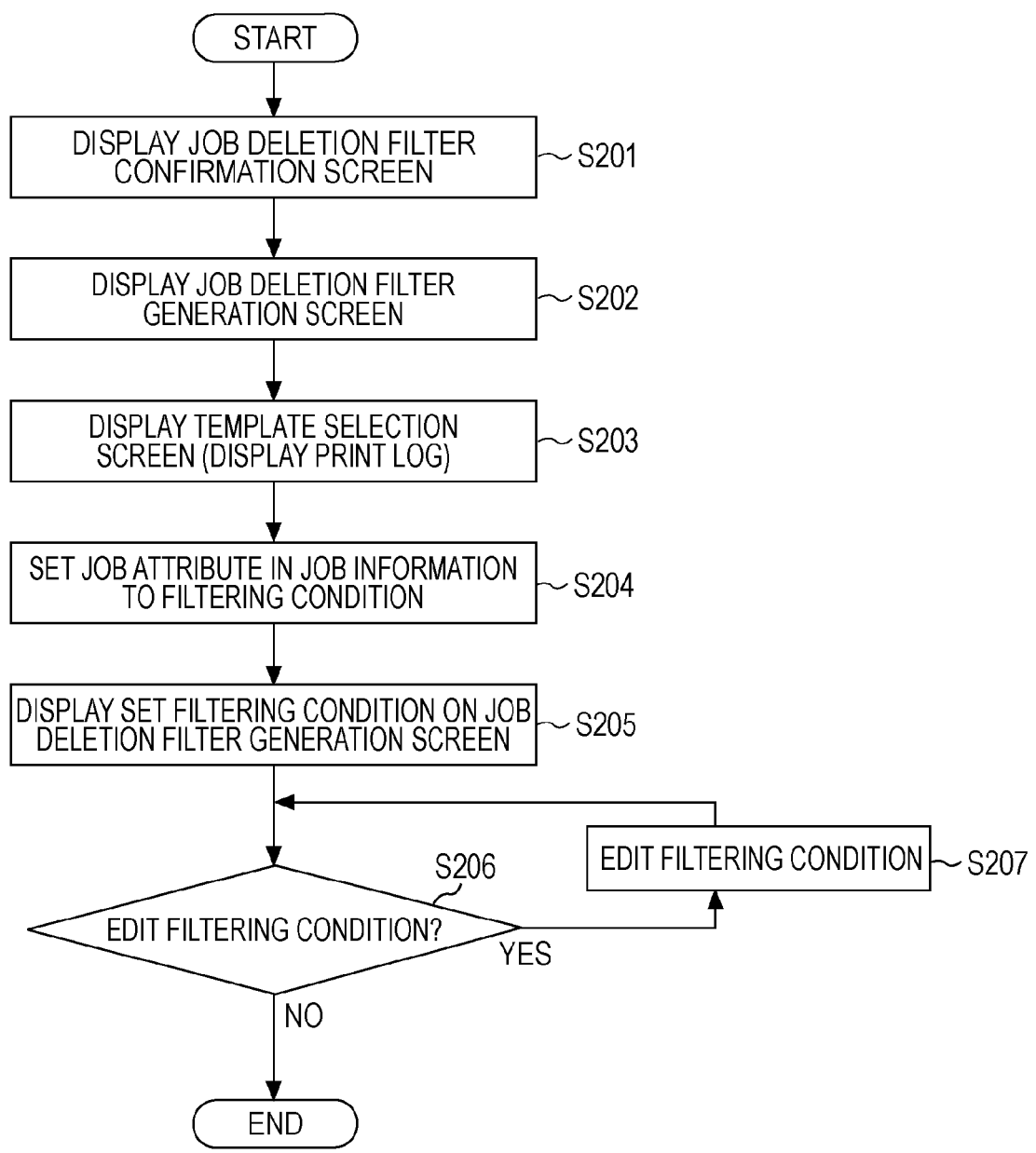
FIG. 11 is a flow chart of an exemplary operation of the printer when the printer generates the print job deletion filter according to the embodiment of the present invention.

FIG. 11 is a flow chart of an exemplary operation performed by the printer 5000 when the printer 5000 generates the print job deletion filter 500. Here, an example of the operation sequence for generating the print job deletion filter 500 is described with reference to FIGS. 7 to 10.

The screens shown in FIGS. 7 to 10 are displayed on the control panel 208 of the printer 5000. By performing an operation through the screens shown in FIGS. 7 to 10, the user instructs the filter management unit 201 to generate or edit the print job deletion filter 500.

In step S201, the filter management unit 201 displays the job deletion filter confirmation screen 900 on the control panel 208 (refer to FIG. 7). When the user presses the addition button 902, the processing proceeds to step S202. In step S202, the filter management unit 201 starts generating the print job deletion filter 500. The filter management unit 201 displays the job deletion filter generation screen 910 on the control panel 208 (refer to FIG. 8).

When the user presses the generation-from-log button 914, the processing proceeds to step S203. In step S203, the filter management unit 201 acquires the job information 400 that is stored in the job log storage unit 202 in the form of a print log. Subsequently, the filter management unit 201 displays the template selection screen 920 on the control panel 208 (refer to FIG. 9). At that time, the filter management unit 201 displays the acquired job information 400 in the print log list table 921. In this way, according to the present embodiment, by performing at least processing in step S203, a notifying unit is realized.

When the user selects a piece of the job information 400 serving as a template for generating the print job deletion filter 500 in the print log list table 921 and, subsequently, presses the template OK button 922, the processing proceeds to step S204. In step S204, the filter management unit 201 sets the job attribute (e.g., the document creator application name 406 and the host address information 407) of the job information 400 selected in step S206 to the filtering condition 503. In this way, according to the present embodiment, by performing at least processing in step S204, a generating unit is realized.

Note that the job attribute set as the filtering condition 503 in step S204 is not limited to the above-described attribute. For example, any attributes contained in the job information 400 can be used (e.g., the user name 403).

In step S205, the filter management unit 201 displays the job deletion filter generation screen 910 on the control panel 208 (refer to FIG. 8). At that time, the filter management unit 201 displays, in the filtering condition list table 911, the filtering condition 503 set in step S204.

In step S206, after the filtering condition 503 displayed in the filtering condition list table 911 is selected, the filter management unit 201 determines whether the condition edit button 915 is pressed. If the condition edit button 915 has been pressed, the processing proceeds to step S207. Otherwise, the processing is completed.

In step S207, the filter management unit 201 stores, in the filter storage unit 203, the filtering condition 503 selected in step S206 together with the filter ID 501. Subsequently, the filter management unit 201 displays the filtering condition edit screen 930 on the control panel 208 (refer to FIG. 10). The filter management unit 201 then changes the filtering condition 503 selected in step S205 on the basis of the operation performed by the user through the filtering condition edit screen 930. As described above, when the filtering condition edit OK button 931 is pressed, the filtering condition 503 is changed to the information displayed in the filtering condition edit screen 930 at that time. The processing then returns to step S206.

In this way, the processing of generating the print job deletion filters 500 is completed.

Filtering Test of Print Job Deletion Filter

Figure 12:
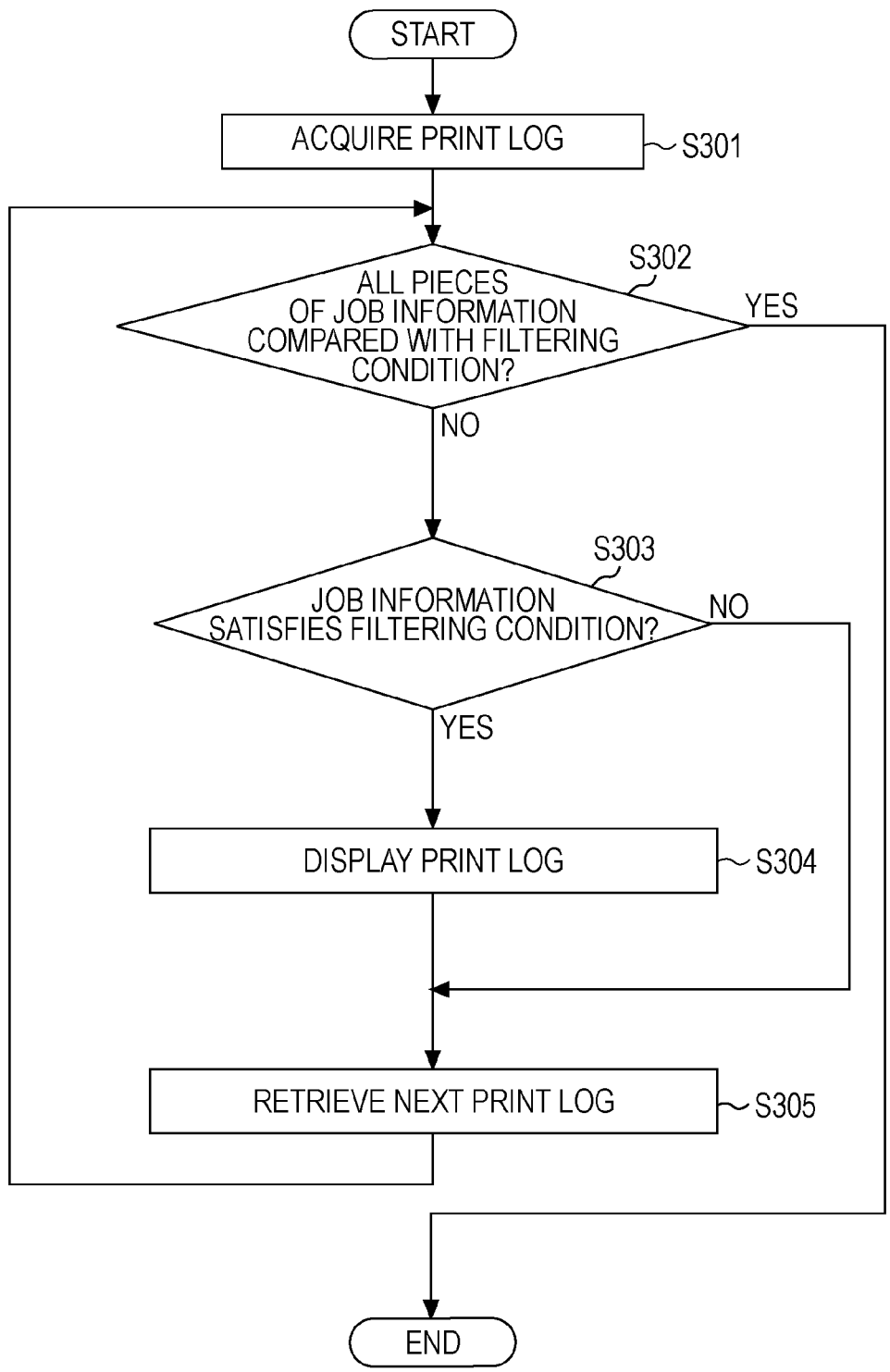
FIG. 12 is a flow chart of an exemplary operation of the printer when the printer tests the print job deletion filter according to the embodiment of the present invention.

FIG. 12 is a flow chart of an exemplary operation of the printer 5000 when the printer 5000 tests the print job deletion filters 500. FIG. 13 illustrates an example of a filtering test result display screen 940. The filtering test result display screen 940 is displayed when the test button 912 of the job deletion filter generation screen 910 shown in FIG. 8 is pressed.

The filtering test result display screen 940 includes a filtering test result table 941 and a filtering test screen OK button 942.

The filtering test result table 941 displays a list of the print logs that satisfy the filtering condition 503 displayed in the filtering condition list table 911 from among the print logs stored in the job log storage unit 202.

The filtering test screen OK button 942 is pressed by the user in order to terminate the display of the filtering test result display screen 940 and display the job deletion filter generation screen 910.

When the test button 912 is pressed during display of the job deletion filter generation screen 910, the filter management unit 201, in step S301, acquires the job information 400 stored in the job log storage unit 202 in the form of the print log.

In step S302, the filter management unit 201 determines whether all pieces of the job information 400 acquired in step S301 are compared with the filtering condition 503. If all pieces of the job information 400 acquired in step S301 have been compared with the filtering condition 503, the filter management unit 201 considers that all of the print logs have been compared with the filtering condition 503, and therefore, the processing is completed.

However, if all pieces of the job information 400 acquired in step S301 have not yet been compared with the filtering condition 503 and the job information 400 remains, the processing proceeds to step S303. In step S303, the print job information comparing unit 205 compares the information of the filtering condition 503 with the information of the job information 400 so as to determine whether the job information 400 satisfies the filtering condition 503. If the job information 400 satisfies the filtering condition 503, the processing proceeds step S304. In step S304, the filter management unit 201 displays, in the filtering test result table 941, the print log of the job information 400 that satisfies the filtering condition 503.

In step S305, the filter management unit 201 retrieves the job information 400 in the next print log, and the processing returns to step S302.

As described above, according to the present embodiment, the print job deletion filter 500 containing the filter ID 501, the number of deleted print jobs 502, and at least one filtering condition 503 is preset in the printer 5000. The filtering condition 503 contains the job attribute 504, the keyword 505, and the search method 506. Subsequently, upon receiving a print job containing print data and the job information 400 from the print server system 4000, the printer 5000 determines whether the job information 400 contained in the print job satisfies the filtering condition 503. If the job information 400 satisfies the filtering condition 503, the print job identified by the job information 400 (the print job received from the print server system 4000) is deleted. Accordingly, execution of the print job can be canceled without requesting the printer 5000 to cancel the execution of the print job. In addition, for example, the user need not wait for arrival of the print job in front of the printer 5000 and operate the console panel of the printer 5000 in order to cancel the print job. Therefore, a print job can be easily and reliably canceled, as compared with the case using the existing methods.

Furthermore, according to the present embodiment, the deleted print job information 600 associated with the print attribute of a print job deleted using the print job deletion filter 500 is stored. If the number of deleted jobs exceeds the predefined number N, the job information 400 common to all pieces of the deleted print job information 600 is added to the print job deletion filter 500. In this way, the filtering condition 503 is periodically reconfigured (updated). Accordingly, a print job can be canceled based on the filtering condition 503 exactly as intended. As a result, the accuracy of the filtering condition 503 can be increased without increasing the workload on the users.

Still furthermore, according to the present embodiment, one of the print job deletion filters 500 is compared with the job information 400 (the print log) stored in the job log storage unit 202, and the comparison result is displayed to users. Accordingly, the accuracy of the filtering condition 503 can be further increased.

While the present embodiment has been described with reference to the case where the print server system 4000 submits a print job to the printer 5000, the present invention is not limited thereto. That is, the source of a print job is not limited to the print server system 4000.

Other Embodiments of Present Invention

Furthermore, the above-described functions of the units of the printing apparatus and the steps of the method for controlling a print job according to the embodiment of the present invention can be realized by running a program stored in a random access memory (RAM) and a read-only memory (ROM). The program and a computer-readable recording medium storing the program are also encompassed by the present invention.

In addition, the present invention can include embodiments in the form of a system, an apparatus, a method, a program, and a recording medium. More specifically, the present invention can be applied to a system constituted by a plurality of devices (e.g., a computer, an interface device, a reader, and a printer). Furthermore, the present invention can be applied to an apparatus comprising a single device (e.g., a printer or a facsimile).

The present invention encompasses the case where a software program that provides the functions of the above-described embodiment (i.e., a program corresponding to the flow charts shown in FIGS. 6, 11, and 12) is directly or remotely supplied to the system, and a computer included in the system or the apparatus reads out and executes the supplied program.

Accordingly, the program code installed in the computer in order to realize the functions of the present invention by using the computer is also encompassed by the present invention. That is, the present invention encompasses a computer program that realizes the functions of the present invention.

In such a case, any format of the program code that realizes the functions of the above-described embodiments can be employed. For example, the formats of the program code include object code, program code executed by an interpreter, and a script data supplied to an operating system (OS).

Examples of the recording medium for supplying the program code include a floppy disk, a hard disk, an optical disk, an MO (magneto optical) disk, a CD-ROM (compact disk-read only memory), a CD-R (CD recordable), a CD-RW (CD-rewritable), a magnetic tape, a nonvolatile memory card, and a ROM, and a DVD (digital versatile disc) (i.e., a DVD-ROM (DVD-read only memory) and DVD-R (DVD-recordable)).

In addition, the program may be supplied by accessing a Web page on the Internet using a browser in a client computer and downloading the computer program of the present invention or an archive file including an auto-install function from the Web page to a recording medium, such as a hard disk.

Furthermore, the program code of the program of the present invention may be divided into a plurality of files, which may be downloaded from different Internet websites. In other words, a WWW (world wide web) server that allows a plurality of users to download a program file that achieves the functions of the present invention are also included in the present invention.

Additionally, the program according to the present invention can be encrypted and stored on a recoding medium, such as a CD-ROM, in order to deliver it to users. A user who satisfies a predetermined criterion can download key information for decrypting the encryption from a web page on the Internet. By using the key information, the user can install the encrypted program in a computer and can execute the program to achieve the present invention.

Furthermore, the functions of the above-described embodiments can be achieved by a computer executing the readout program. The functions of the above-described embodiments can also be achieved by an OS running on the computer and executing some of or all of the functions of the above-described embodiments.

The present invention can also be achieved by writing the program code read out of the storage medium to a memory of an add-on expansion board of a computer or a memory of an add-on expansion unit connected to a computer. The functions of the above-described embodiments can be realized by a process in which, after the program code is written, a CPU in the add-on expansion board or in the add-on expansion unit executes some of or all of the functions in the above-described embodiments under the control of the program code.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Application No. 2007-255482 filed Sep. 28, 2007, which is hereby incorporated by reference herein in its entirety.

What is claimed is:

1. A printing apparatus comprising:
   a registering unit configured to register condition information relating to a job attribute of a print job to be cancelled, via a control panel of the printing apparatus;
   a receiving unit configured to receive the print job;
   a first determination unit configured to determine whether the print job received by the receiving unit satisfies the condition information registered by the registering unit;
   a canceling unit configured to cancel execution of the print job received by the receiving unit when the first determination unit determines that the print job received by the receiving unit satisfies the condition information registered by the registering unit;
   a storing unit configured to store job information of the print job received by the receiving unit in the storage medium when the first determination unit determines that the print job does not satisfy the condition information registered by the registering unit;
   an update unit configured to update the condition information registered by the registering unit using the job information stored by the storing unit; and
   a second determination unit configured to determine whether the number of print jobs whose execution is canceled by the canceling unit exceeds a predefined value,
   wherein, if the second determination unit determines that the number of print jobs whose execution is canceled by the canceling unit exceeds the predefined value, the update unit updates the condition information registered by the registering unit using a common item contained in all pieces of the job information stored by the storing unit.

2. The printing apparatus according to claim 1, further comprising:
   a notifying unit configured to notify a user of the job information stored by the storing unit,
   wherein the generating unit generates condition information for canceling execution of the print job based on a piece of job information selected, by the user, from among pieces of the job information notified by the notifying unit.

3. The printing apparatus according to claim 1, wherein the canceling unit cancels execution of a printing operation for the print job received by the receiving unit by deleting the print job.

4. The printing apparatus according to claim 1, wherein the job attribute includes any one of a document creator application name, a host address, and a user name.

5. A method for controlling a print job, comprising:
   registering, by a registering unit, condition information relating to a job attribute of a print job to be cancelled, via a control panel of the printing apparatus;
   receiving, by a receiving unit, the print job;
   determining, by a first determination unit, whether the print job received by the receiving unit satisfies the condition information registered by the registering unit;
   cancelling, by a canceling unit, execution of the print job received by the receiving unit when the first determination unit determines that the print job received by the receiving unit satisfies the condition information registered by the registering unit;
   storing, by a storing unit, job information of the print job received by the receiving unit in the storage medium when the first determination unit determines that the print job does not satisfy the condition information registered by the registering unit;
   updating, by an update unit, the condition information registered by the registering unit using the job information stored by the storing unit; and
   determining, by a second determination unit, whether the number of print jobs whose execution is canceled by the canceling unit exceeds a predefined value,
   wherein, if the second determination unit determines that the number of print jobs whose execution is canceled by the canceling unit exceeds the predefined value, the update unit updates the condition information registered by the registering unit using a common item contained in all pieces of the job information stored by the storing unit.

6. A non-transitory computer readable storage medium having a computer-executable program code stored thereon for causing a computer to execute a method for controlling a print job, the method comprising:
   registering, by a registering unit, condition information relating to a job attribute of a print job to be cancelled, via a control panel of the printing apparatus;
   receiving, by a receiving unit, the print job;
   determining, by a first determination unit, whether the print job received by the receiving unit satisfies the condition information registered by the registering unit;
   cancelling, by a canceling unit, execution of the print job received by the receiving unit when the first determination unit determines that the print job received by the receiving unit satisfies the condition information registered by the registering unit;

storing, by a storing unit, job information of the print job received by the receiving unit in the storage medium when the first determination unit determines that the print job does not satisfy the condition information registered by the registering unit;

updating, by an update unit, the condition information registered by the registering unit using the job information stored by the storing unit; and determining, by a second determination unit, whether the number of print jobs whose execution is canceled by the canceling unit exceeds a predefined value, wherein, if the second determination unit determines that the number of print jobs whose execution is canceled by the canceling unit exceeds the predefined value, the update unit updates the condition information registered by the registering unit using a common item contained in all pieces of the job information stored by the storing unit.

* * * * *